F. B. CARLISLE.
INDICATING MEANS.
APPLICATION FILED FEB. 28, 1912.
1,137,697.
Patented Apr. 27, 1915.
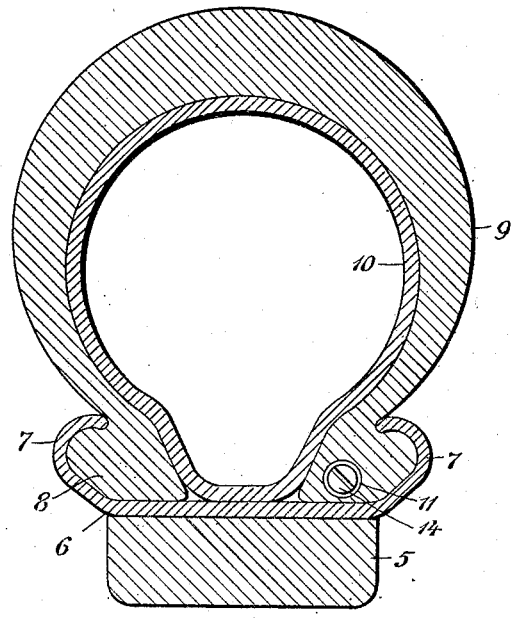
Fig. 1.
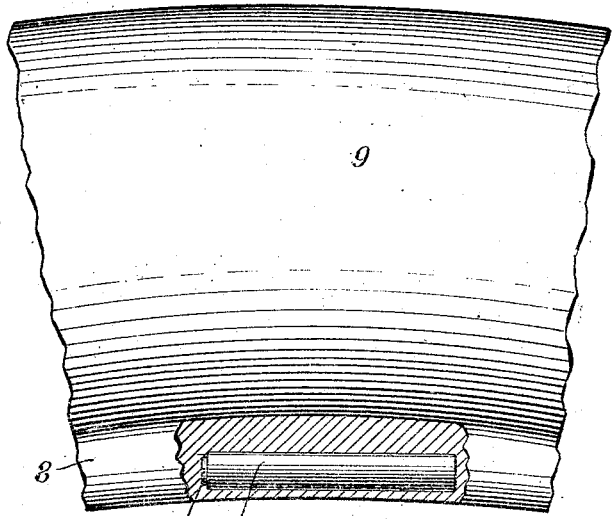
Fig. 2.
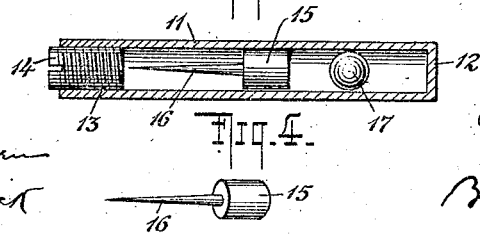
Fig. 3.
Fig. 4.
WITNESSES
INVENTOR
Fred B. Carlisle
BY
ATTORNEYS

UNITED STATES PATENT OFFICE.

FRED B. CARLISLE, OF MALDEN, MASSACHUSETTS, ASSIGNOR TO REVERE RUBBER COMPANY, A CORPORATION OF RHODE ISLAND.

INDICATING MEANS.

1,137,697.  Specification of Letters Patent.  Patented Apr. 27, 1915.

Application filed February 28, 1912. Serial No. 680,510.

*To all whom it may concern:*

Be it known that I, FRED B. CARLISLE, a citizen of the United States, and resident of Malden, county of Middlesex, State of Massachusetts, have invented a certain new and useful Improvement in Indicating Means, of which the following is a specification.

My invention relates to indicating means and contemplates providing a vehicle tire, such as for instance an automobile tire, with a means for indicating the extent of the use to which the tire has been subjected or in other words the distance it has traversed.

My invention will be fully described hereinafter, and the features of novelty will be pointed out in the appended claims.

Reference is to be had to the accompanying drawings in which I have shown one embodiment of my invention and in which—

Figure 1 is a cross-section of a part of a tire in position on the usual rim and having my invention applied thereto; Fig. 2 is a side elevation of a part of the tire; Fig. 3 is a longitudinal section of the form of my improvement illustrated herein and Fig. 4 is a perspective view of an element thereof.

In the drawings 5 is the felly of the wheel to the outer peripheral surface of which the usual tire carrying rim 6 is attached in any suitable and convenient manner. This rim 6 is provided with the customary circumferential hooks 7 for receiving the beads 8 of the tire shoe 9 inclosing the usual inner tube 10 which is inflated in the well known way.

In the form which I have chosen to illustrate my invention the indicating means comprises a tube 11 made of metal or any other suitable material and having its one end closed as illustrated at 12 and its other end open and internally screw threaded as shown at 13. This open screw-threaded end 13 is adapted to receive an externally screw-threaded plug 14 preferably made of gutta percha or some other material which at all times has a substantially uniform density. A boring means having a head 15 to which is secured a boring bit 16 is located in said tube 11 and is freely movable lengthwise thereof, said head 15 preferably having a running fit in said tube so as to act as a guide for the bit 16. The bit 16 is preferably positioned on said head so as to register with the longitudinal axis of the tube and projects toward the plug 14 when the parts are assembled. An impact device, in the present instance a ball 17 is also located in said tube so as to be freely movable axially thereof and preferably has a diameter only slightly smaller than the inner diameter of said tube. As can be clearly seen by referring to Fig. 3 of the drawings this ball 17 is movable between the head 15 of the boring means and the closed end 12 of the tube when the parts are in their assembled condition. In its operative position the present indicating means is carried by the tire and is preferably located in some convenient part of the tire shoe so as to be invisible in the finished shoe and with its longitudinal axis extending in the direction of the circumference of the tire or in other words the direction of the rotation when the shoe is in position on a vehicle wheel the end 13 and plug 14 being preferably though not necessarily toward the front. The preferred location of the indicating means as shown in Figs. 1 and 2 of the drawings is in one of the beads 8 of the tire shoe, in close proximity to the inner surface thereof so that said means is sealed against unauthorized tampering, the said location preferably being at a point unknown to the purchaser of the shoe.

In operation, as the vehicle wheel revolves the ball or impact device 17 will be alternately lifted against gravity and dropped by gravity so that said ball or impact device 17 will be caused to move back and forth in the space between the head 15 and closed end 12 of the tube 11. The said ball 17 each time it is dropped by gravity will thus impact against said head 15 and will deliver a blow thereon at least once during each complete revolution of the wheel and will consequently drive the boring bit 16 into the plug 14. As the wheel continues to revolve each succeeding blow of the ball 17 on the head 15 will drive the bit 16 a little farther into the plug 14 so that it is necessary for the wheel to make a certain number of revolutions or in other words for the tire to traverse a certain number of miles before the bit 16 is finally forced completely through said plug 14. Thus by calculations and experiment the length of the plug 14 may be determined so that it will be necessary for the tire to have made a sufficient number of revolutions to cover the distance for which it is guaranteed the boring bit will have completely penetrated the said plug. Thus if the tire is guaranteed for instance for 3500 miles, the plug will be punctured only after approximately 3500 miles have been traversed by the tire and said plug will be bored into for only a proportionate part of its length if less than this distance has been traveled.

If the tire is returned in a worn condition to the manufacturer and the argument advanced that it has not lived up to its guarantee or in other words has reached its damaged or worn condition after say only 1500 miles, or any other number less than the guaranteed mileage have been covered the truth or falsity of the statement may be ascertained by simply inspecting the indicating means. If the said means is concealed in some portion of the tire as in the present instance, the bead of the tire, the said bead is slitted or cut at the point where the indicating means is located which is readily possible owing to the thinness of the material at this point and the indicating means then removed. After having been thus removed the plug 14 may be easily unscrewed from the tube 11 and inspected. If the boring bit has only partly penetrated into said plug 14 and the depth of the bore relatively to the length of the plug after being computed, which may readily be done by means of a suitable instrument, is found to correspond substantially to the depth of bore which would be made in the plug by the boring bit after 1500 miles has been traveled then it is at once evident that the contention is correct and that the tire has not lived up to its guarantee. If on the contrary it is found on inspection that the said plug has been completely penetrated by the boring bit then it is at once apparent that the tire has traveled over the maximum number of miles for which it is guaranteed and that the statement that less than this mileage has been traversed is not correct. The tire manufacturer is thus protected against imposition by unscrupulous persons, it being understood that the above examination and inspection should preferably be made out of the presence of the person returning the tire shoe so that the existence of the indicating means will remain unknown to him.

In order to make it easy for the manufacturer to easily find the point of the tire shoe where the indicating means is located, any sort of indicating mark may be used, or said indicating means may be located at a point registering with a certain letter or letters of the manufacturer's name or trade mark which usually are produced on said tire shoe, this particular letter or said letters thus becoming the locating mark. These indicating marks will of course remain unknown to the general public.

It will readily be seen that my improvement provides a simple and reliable means for checking up the approximate number of rotations the tire shoe has made or in other words the number of miles of roads over which it has traveled. That is to say, the plug 14 is what might be termed a record receiving means while the boring bit represents a record producing means coöperating therewith to record the extent of use to which the tire has been subjected. When in operative position in the present illustration of the invention the said means is absolutely protected against tampering as its existence is not apparent and does not change the appearance of the tire shoe. Should the location of the indicating means, however, become known and said means be tampered with, this fact would at once be apparent to the manufacturer owing to the fact that the tire must be cut to remove the said means and make it accessible. This would still be so even if the cut were repaired or closed by vulcanization as the evidences of the vulcanization process would always be present.

It is to be understood that the indicating means need not be embedded in the tire but may be located exteriorly thereof at a convenient point and the plug 14 for instance sealed therein against removal without detection. It is further to be understood that in some cases the metal tube 11 may be dispensed with and a tubular recess produced in the tire for the accommodation of the plug 14, boring bit 16 and ball 17 or analogous devices. In this case these elements would be incorporated in the tire during its manufacture.

While I have described my improvement in connection with a pneumatic tire it is to be understood that the said improvement is equally well adapted for use in connection with any other form of tire.

Various changes in the specific form shown and described may be made without departing from the spirit of my invention.

I claim:

1. The combination of a vehicle tire and means carried thereby for indicating the extent of use to which the tire has been subjected, said means comprising an element held in position in relation to said tire by friction, and means for overcoming said friction to progressively change the position thereof, in accordance with the extent of travel of said tire.

2. The combination of a vehicle tire and means carried thereby for indicating the extent of use to which the tire has been subjected, said means comprising a resistive medium, an element adapted to penetrate the same, and means for causing said element to penetrate said medium in accordance with the extent of travel of said tire.

3. The combination of a vehicle tire and means carried thereby for indicating the extent of use to which the tire has been subjected, said means comprising two members held frictionally in relative positions and a loose actuating member adapted to impact with one of said members by movement of the tire and to change their relative positions in accordance with the extent of travel of the tire.

4. The combination of a vehicle wheel, a tire therefor, a tube carried by said tire, a plug extending into one end of said tube, a boring bit adapted to bore into said plug to indicate the extent of use to which the tire has been subjected and means for delivering a blow to said bit during each revolution of the wheel.

5. The combination of a vehicle wheel, a tire therefor, a tube carried by said tire, a plug removably secured in one end of said tube, a head movable in said tube, a boring bit carried by said head and adapted to bore into said plug to indicate the extent of use to which the tire has been subjected, and a gravity operated ball in said tube arranged to deliver a blow to said head during each revolution of the wheel.

In testimony whereof I have hereunto set my hand in the presence of two subscribing witnesses.

FRED B. CARLISLE.

Witnesses:
  JOHN A. KEHLENBECK,
  D. WECKRUDEM.